US012478209B2

(12) United States Patent
Moser

(10) Patent No.: US 12,478,209 B2
(45) Date of Patent: Nov. 25, 2025

(54) BEVERAGE PREPARATION DEVICE WITH THERMALLY OPTIMISED ARCHITECTURE

(71) Applicant: SOCIETE DES PRODUITS NESTLE S.A., Vevey (CH)

(72) Inventor: Renzo Moser, Gummenen (CH)

(73) Assignee: Societe des Produits Nestle S.A., Vevey (CH)

(*) Notice: Subject to any disclaimer, the term of this patent is extended or adjusted under 35 U.S.C. 154(b) by 918 days.

(21) Appl. No.: 17/600,220

(22) PCT Filed: Apr. 3, 2020

(86) PCT No.: PCT/EP2020/059475
§ 371 (c)(1),
(2) Date: Sep. 30, 2021

(87) PCT Pub. No.: WO2020/201469
PCT Pub. Date: Oct. 8, 2020

(65) Prior Publication Data
US 2022/0202231 A1 Jun. 30, 2022

(30) Foreign Application Priority Data
Apr. 5, 2019 (EP) .................... 19167543

(51) Int. Cl.
A47J 31/36 (2006.01)
A47J 31/06 (2006.01)
(Continued)

(52) U.S. Cl.
CPC ....... A47J 31/3676 (2013.01); A47J 31/0673 (2013.01); A47J 31/22 (2013.01);
(Continued)

(58) Field of Classification Search
CPC ................ A47J 31/0673; A47J 31/3628; A47J 31/3623; A47J 31/3695; A47J 31/369; A47J 31/22
(Continued)

(56) References Cited

U.S. PATENT DOCUMENTS 5,794,519 A * 8/1998 Fischer ............... A47J 31/3695
99/302 R
7,461,585 B2 * 12/2008 Nenov .................. A47J 31/005
210/473
(Continued)

FOREIGN PATENT DOCUMENTS

CN 101883512 A 11/2010
CN 103648341 A 3/2014
(Continued)

OTHER PUBLICATIONS

Japanese Office Action for Appl No. 2021-558558 dated May 28, 2024, 3 pages.
(Continued)

Primary Examiner — Reginald Alexander
(74) Attorney, Agent, or Firm — K&L Gates LLP

(57) ABSTRACT

A capsule processing machine (1) for preparing a beverage (3) from an ingredient-containing capsule (2) by passing water into such capsule, has a beverage processing unit (10,20). Such unit (10,20) has a holder (10) delimiting a receiving space (11) for receiving such capsule (2). The unit (10,20) includes a cover (20) for covering the holder (10), the cover (20) and the holder (10) being relatively movable: from an open position for transferring the capsule (2) into or out of the receiving space (11); into a closed position for preparing the beverage from the capsule (2). The unit (10,20) has a beverage outlet arrangement (21) extending between the holder (10) and the cover (20) and/or through the cover (20), configured to deliver the beverage (3) from
(Continued)

the unit (10,20). The unit (10,20) has a water inlet (22) extending through the cover (20) configured to guide water (4) into the receiving space (11) where it is mixed with the flavouring ingredient in the capsule (2). The machine (1) has a thermal conditioner (30) that has a body (31) forming a thermally conditioned beverage collecting surface (35) configured to collect and thermally condition the beverage (3) delivered from the outlet arrangement (21). The body (31) of the conditioner (30) is configured to thermally condition in the body (31) the water (4) for delivery into the inlet (22). The body (31) of the conditioner (30) forms a conditioner cavity (31) that delimits or contains at least partly the cover (20).

20 Claims, 2 Drawing Sheets

(51) Int. Cl.
  *A47J 31/22* (2006.01)
  *A47J 31/54* (2006.01)
(52) U.S. Cl.
  CPC ............ *A47J 31/54* (2013.01); *A47J 31/3628* (2013.01); *A47J 31/3695* (2013.01)
(58) Field of Classification Search
  USPC .............................................. 99/295, 302 C
  See application file for complete search history.

(56) References Cited

U.S. PATENT DOCUMENTS

| | | | |
|---|---|---|---|
| 7,506,577 B2 * | 3/2009 | Maver ................. | A47J 31/3623 99/289 R |
| 2015/0289707 A1 * | 10/2015 | Kaeser ................. | A47J 31/407 99/295 |
| 2017/0367519 A1 * | 12/2017 | Capitani ............. | A47J 31/3623 |

FOREIGN PATENT DOCUMENTS

| | | | | |
|---|---|---|---|---|
| CN | 103781388 A | 5/2014 | | |
| CN | 109195488 A | 1/2019 | | |
| EP | 2633789 | 9/2013 | | |
| JP | H0722552 B2 | 3/1995 | | |
| JP | 2012516740 A | 7/2012 | | |
| JP | 2016502437 A | 1/2016 | | |
| JP | 2016503670 A | 2/2016 | | |
| WO | WO-2015101557 A1 * | 7/2015 | .......... | A47J 31/0631 |
| WO | 2018158179 | 9/2018 | | |
| WO | 2018219989 | 12/2018 | | |

OTHER PUBLICATIONS

Japanese Office Action for Appl No. 2021-558558 dated Dec. 21, 2023.
Chinese Office Action for Appl No. 202080021253.0 dated Jul. 30, 2023.

* cited by examiner

BEVERAGE PREPARATION DEVICE WITH THERMALLY OPTIMISED ARCHITECTURE

CROSS REFERENCE TO RELATED APPLICATIONS

The present application is a National Stage of International Application No. PCT/EP2020/059475, filed on Apr. 3, 2020, which claims priority to European Patent Application No. 19167543.8, filed on Apr. 5, 2019, the entire contents of which are being incorporated herein by reference.

FIELD OF THE INVENTION

The field of the invention pertains to beverage preparation machines which uses thermally conditioned liquid, such as heated and/or cooled liquid. The liquid is typically water or water-based. The machine may be configured to prepare the beverage by passing the liquid through a capsule containing an ingredient of the beverage to be prepared, such as at least one of coffee, tea, cacao, milk, sugar and/or soup ingredient. For instance, the liquid is mixed with the ingredient contained in the capsule by centrifuging the capsule while the liquid is passed through the capsule.

For the purpose of the present description, a "beverage" is meant to include any human-consumable liquid substance, such as tea, coffee, hot or cold chocolate, milk, soup, baby food, etc. . . . A "capsule" is meant to include any container such as a packaging for containing a pre-portioned beverage ingredient, e.g. a flavouring ingredient, the packaging forming an enclosure of any material, in particular an airtight or pervious material, porous or non-porous material, e.g. plastic, aluminium, recyclable and/or biodegradable packagings, and of any shape and structure, including soft pods or rigid cartridges for containing the ingredient.

BACKGROUND ART

Certain beverage preparation machines use capsules containing ingredients to be extracted or to be dissolved and/or ingredients that are stored and dosed automatically in the machine or else are added at the time of preparation of the drink. Some beverage machines possess filling means that include a pump for liquid, usually water, which pumps the liquid from a source of water that is cold or indeed heated through heating means, e.g. a thermoblock or the like.

Especially in the field of coffee preparation, machines have been widely developed in which a capsule containing beverage ingredients is inserted in a brewing device. The brewing device is tightly closed about the capsule, water is injected at the first face of the capsule, the beverage is produced in the closed volume of the capsule and a brewed beverage can be drained from a second face of the capsule and collected into a receptacle such as a cup or glass.

The preparation of a beverage by using centrifugation is known. Such beverage preparation includes: providing a beverage (flavoring) ingredient, e.g. as powder and/or leaves, in a capsule; circulating liquid into the capsule and rotating the capsule at sufficient speed to ensure interaction of the liquid with the ingredient while creating a gradient of pressure of liquid in the capsule. Such pressure increases gradually from the center towards the periphery of the capsule. As liquid traverses the ingredient, e.g. coffee bed, extraction of the ingredient, e.g. coffee compounds, takes place and a liquid extract is obtained that flows out at the periphery of the capsule. Examples of such systems are disclosed in WO2008/148601, WO 2013/007776, WO 2013/007779 and WO 2013/007780.

When no appropriate measure is taken, centrifugal systems suffer the inconvenience that the liquid extract discharged from the device is exposed to significant heat exchange with the environment which leads to a beverage that can be significantly colder or hotter than desired. In particular, the liquid extract can cool down (if the liquid is previously heated) or warm up (if the liquid is previously cooled) in the collecting device by heat exchange with the large surfaces of the collector of the device. This results from the fact that the brewing unit is rotated along a central axis to form a thin layer or jets of liquid impacting on a substantially tubular impact surface. The liquid comes in contact with and drip from a surface that can be equal, for instance, to a first impact surface which, when it is cylindrical, may have a surface area of at least about 500 mm$^2$. Furthermore, if the liquid is then collected in a generally U-shaped cavity that leads to a dispensing duct, such cavity forms again extensive areas of contact with the extracted liquid. Furthermore, the receptacle such as a cup further cools the liquid down unless it has been heated before being placed under the device for the reception of the liquid.

Furthermore, certain beverage ingredients, such as roast and ground coffee or tea, must be brewed with a heated liquid, e.g., hot water, within a particular range of temperature to ensure the full extraction of the ingredients including the capture of the desired aroma compounds. Therefore, the liquid supplied in the brewing unit cannot be overheated to compensate for the temperature losses endured by the liquid after extraction as it would negatively affect the quality of extraction. The range of temperatures for an optimal brewing such as for coffee or tea must be so respected for ensuring the best quality of the final beverage. Furthermore, other quality characteristics of the coffee beverage must be preserved during preparation such as the head of foam called "crema".

It is already known from EP 2393404 A1 to compensate for a temperature loss in a device as described above by using additional heating elements, but these devices are very complex.

Advantageous systems to manage the temperatures of the liquid before mixing it with the beverage flavouring ingredient and of the resulting beverage are disclosed in WO 2010/089329 and in WO 2014/090850.

There is still a need to optimise the thermal management of the liquid before and after mixing it with the beverage flavouring ingredient.

SUMMARY OF THE INVENTION

The invention relates to a capsule processing machine for preparing a beverage from at least one ingredient. Normally such beverage is then dispensed to a user, e.g. to a user-cup or user-mug.

For instance, the machine is a coffee, tea, chocolate, cacao, milk or soup preparation machine. For example, the machine is arranged for preparing within a beverage processing module that includes the capsule holder, a beverage by passing hot or cold water or another liquid through a capsule held in the holder containing an ingredient, such as a flavouring ingredient, of the beverage to be prepared, such as ground coffee or tea or chocolate or cacao or milk powder.

Such beverage preparation typically includes the mixing of a plurality of beverage ingredients, e.g. water and milk powder, and/or the infusion of a beverage ingredient, such as an infusion of ground coffee or tea with water. For instance, a predetermined amount of beverage is formed and dispensed on user-request, which corresponds to a serving. The volume of such a serving may be in the range of 15 to 1000 ml such as 25 to 600 ml for instance 40 to 250 ml, e.g. the volume for filling a cup or mug, depending on the type of beverage. Formed and dispensed beverages may be selected from ristrettos, espressos, lungos, cappuccinos, café latte, americano coffees, teas, etc. . . . For example, a coffee machine may be configured for dispensing espressos, e.g. an adjustable volume of 20 to 60 ml per serving, and/or for dispensing lungos, e.g. a volume in the range of 70 to 200 ml per serving, and/or for dispensing americanos, e.g. a volume in the range of 150 to 750 ml.

An aspect of the invention relates to a capsule processing machine for preparing a beverage from a capsule having a body containing a flavouring ingredient, e.g. coffee or tea or cacao or milk, by passing water into such capsule so as to be mixed with the flavouring ingredient in the capsule. For instance, the mixing is achieved by centrifugally driving such capsule.

The capsule may have a body containing an ingredient and a peripherally projecting flange.

The capsule may be of the type described above under the header "field of the invention". The capsule may be a capsule that has a container-body, e.g. a generally cup-shaped or hemispherical or hemi-ellipsoidal body, having a flange to which a cover lid is attached, in particular sealed. Typically the capsule contains a beverage ingredient.

The capsule may have a or the above body that is symmetric or asymmetric, conical or frusto-conical, pyramidal or frusto-pyramidal, cylindrical or prismatic, spherical or hemispherical or frusto-spherical, domical or frusto-domical, containing the ingredient, e.g. ground coffee, tea or cacao or another beverage ingredient.

The machine has a beverage processing unit.

Such unit includes a holder delimiting a receiving space for receiving the capsule. For instance, the receiving space delimits a holder cavity having an upwardly or sidewardly or slantingly (between upwardly and sidewardly) oriented mouth via which the capsule is received in the holder (e.g. opening delimited by a holder's rim), such as a mouth generally contained in a horizontal plane. The capsule may have a or the above capsule flange that extends generally in parallel to the mouth. The holder cavity may be shaped generally as a cup, e.g. to match the shape of the capsule.

The unit has a cover, such as a lid, for covering the holder. The cover and the holder are relatively movable: from an open position for placing said capsule into the receiving space and/or removing the capsule from the receiving space; into a closed position for preparing said beverage from said capsule in the receiving space.

The capsule holder and/or the cover may be drivable in rotation by a motorized drive axis, e.g. for centrifugation of the capsule.

For instance, the machine incorporates the features disclosed in WO 2008/148604, WO 2009/106598, WO 2014/096122 or WO 2014/096123.

The unit has a beverage outlet arrangement extending between the holder and the cover and/or through the cover. The outlet arrangement is configured to deliver the beverage from the processing unit. The outlet arrangement can be formed by a plurality of interstices between the holder and the cover. For instance, the interstices are delimited by a peripheral part of the cover and a facing interface face of the capsule, e.g. a peripheral flange of the capsule. For example, the outlet arrangement is in a generally horizontal and/or planar arrangement at a periphery of the cover facing the holder in the closed position of the cover and the holder.

Examples of outlet arrangements are disclosed in WO 2009/106175, WO 2012/100836, WO 2013/020939 and WO 2017/068134.

The unit includes a water inlet extending through the cover. The inlet is configured to guide water into the receiving space where it is mixed with the flavouring ingredient in the capsule to form the beverage.

The inlet may include the features disclosed in WO 2010/063644.

The capsule holder and cover can be incorporated into an ingredient processing module of a beverage preparation device, typically of the centrifugal type, e.g. as disclosed in EP 2 000 062, EP 2 155 020, EP 2 152 128, WO 2008/148646, WO 2008/148650, WO 2008/148834, WO 2009/106175, WO 2009/106589, WO 2010/026045, WO 2010/026053, WO 2010/063644, WO 2010/066705, WO 2010/066736 and WO 2011/023711.

The capsule holder and cover may be secured together in their closed position by a corresponding arrangement, e.g. as disclosed in WO 2012/007293 and WO 2014/102048.

The machine may have a capsule transfer device, e.g. as disclosed in WO 2012/041605, WO 2017/046294 and WO 2017/202746.

The processing unit may be fitted with an arrangement for opening the capsule, e.g. as disclosed in WO 2008/148656, WO 2010/026045 and WO 2010/066736.

The processing unit may be configured for receiving capsules of different sizes, e.g. as disclosed in WO 2011/023711.

The machine has a thermal conditioner, such as a heater and/or a cooler, that has a body forming a thermally conditioned beverage collecting surface. This collecting surface may delimit at least part of an annular cavity facing, e.g. surrounding, the outlet arrangement.

For instance, the cavity is generally U-shaped in cross-section. The annular cavity may have an outer beverage impact wall and an inner beverage confinement wall and a lower bottom. For example, the impact wall and/or the confinement wall is/are formed by the conditioner's body. The bottom may be formed by the conditioner's body or by a component that is thermally substantially distinct thereto and that is significantly less thermally conductive than the conditioner's body.

The collecting surface may include the features disclosed in WO 2013/020940.

The thermally conditioned beverage collecting surface is configured to collect and thermally condition the beverage delivered from the outlet arrangement.

The body of the thermal conditioner is configured to thermally condition in the body the water for delivery into the inlet, such as into the inlet via a water conduit fluidically connecting the thermal conditioner and the inlet.

The machine may have a selection arrangement, such as a control unit and connected thereto at least one of a user-interface and a capsule recognition arrangement, configured to select a particular volume of water of a plurality of selectable available volumes to be supplied to said water inlet for preparing a correspondingly resulting particular volume of said beverage. For instance, the selectable available volumes include about 15 ml, about 20 ml, about 25 ml, about 30 ml, about 35 ml, about 40 ml and so on until about 200, 400, 700 or even 1000 ml. Examples of preparation regulations are disclosed in WO 2010/026053, WO 2014/090965 and PCT/EP18/085737.

An automatic capsule recognition system may be used to parameterize and adjust the processing of the ingredient automatically in line with the type of ingredient. Examples of such technologies and associated features are disclosed in WO2011/141532, WO2011/141535, WO 2012/010470, WO 2013/072239, WO 2013/072297, WO 2013/072326, WO 2013/072351 and WO 2015/044400.

Examples of user-interfaces are disclosed in WO 2015/096998.

The thermal conditioner body forms a conditioner cavity that delimits or contains at least partly the cover.

The conditioner cavity may delimit or contain the cover when the holder and the cover are in the closed position and when the holder and the cover are in the open position.

The conditioner's body may surround entirely the beverage processing unit at a level of the unit's beverage outlet arrangement.

It follows that the thermal conditioner that thermally conditions the beverage flowing out of the beverage processing unit and that thermally conditions the water that flows into the beverage unit, is located closely to the inlet and to the outlet arrangement of the beverage processing unit, so that the liquid paths (water path and beverage path) between the thermal conditioner and the processing unit can be small and that thermal perturbations along these paths can be reduced accordingly. The beneficial effect is increased by having both the inlet and outlet arrangement on and/or at the same part of the beverage processing unit, i.e. the cover.

In an embodiment, the machine has a frame or outside housing that is stationary when the beverage is being prepared from the capsule in the receiving space, the cover being movable relative to the frame or housing between the open and closed positions. For instance, the holder is stationary relative to the frame or outside housing when the cover and the holder are relatively moved between the open and closed positions.

The thermal conditioner can be movable together with the cover relative to the frame or outside housing.

The cover may be pivotally and/or translationally movable relatively to the frame or outside housing along a guiding structure.

The cover can be pivotable relative to the frame or outside housing about a pivoting axis that is remote from the thermal conditioner. The pivoting axis and the thermal conditioner may be spaced by a spacing distance that is greater than a greatest dimension of the receiving space. Hence, the spacing can be such as to allow a passage of a capsule, e.g. after use of the capsule in the processing unit.

For example, the machine has a functional block, such as a used capsule reservoir and/or a water reservoir. The cover may be pivotable relative to the frame or outside housing about the pivoting axis that is remote from the thermal conditioner. The functional block or an access to the functional block may be located in a space spacing the pivoting axis and the receiving space.

The cover may be pivotable relative to the frame or outside housing about a pivoting axis that is remote from the thermal conditioner. The cover may be connected to the pivoting axis by a connection member. The connection member may cover a or the above functional block when the cover and the holder are in the closed position and may uncover the functional block when the cover and the holder are in the open position. For instance, the connection member forms a or an upper housing part.

At least one of the holder and the cover may be connected to a driver that is arranged to drive the holder and the cover in rotation when the holder and the cover are in the closed position. For instance, the driver is configured to centrifuge the receiving space containing the flavouring ingredient in the capsule and water delivered by the thermal conditioner into the receiving space to: prepare the beverage; and/or deliver the beverage via the beverage outlet arrangement.

The machine typically has a discharge arrangement configured to guide the beverage from the beverage collecting surface to a dispensing area configured to receive a user-receptacle for collecting such beverage from such machine. The dispensing area may be delimited by an outside upright machine face and/or a cup support.

The discharge arrangement may have an upstream part that is stationary relative to the cover when the holder and the cover are relatively moved between the open position and the closed position.

The discharge arrangement can have a downstream part that is stationary relative to the holder when the holder and the cover are relatively moved between the open position and the closed position.

The discharge arrangement may have a tubular part. For example, the tubular part forms a or the above upstream part.

The discharge arrangement may include a downstream member. The member may be a downstream chamber for refining foam contained in the beverage e.g. by a refining arrangement such as one or more bubble dividers and/or a liquid diverting member that is configured to direct selectively the beverage to the dispensing area and waste liquid to a waste collector. For instance, the downstream member forms a or the above downstream part.

The discharge arrangement can include at least one part, such as a or the above downstream part that is removable by a user for cleaning and/or servicing.

The discharge arrangement can have a first part, such as a or the above upstream part, and a second part, such as a or the above downstream part. The second part can be mounted in or to a or the above outside housing that is stationary when the beverage is being prepared from the capsule in the receiving space. The first part can be mounted in or to a connection member connecting the cover to a guiding structure configured for enabling the holder and the cover to relatively move, e.g. pivotally and/or translationally, between their open and closed positions along the guiding structure, so that when the holder and the cover are in their closed position the first part projects into the outside housing and/or the second part projects into the connection member.

The discharge arrangement can include the configurations disclosed in PCT/EP18/085359, PCT/EP18/085360 and PCT/EP18/085763.

The machine can be configured such that the beverage, when leaving the beverage collecting surface, and the water, when guided by the water inlet, have a temperature difference of less than 10° C., such as a difference of less than 7° C., e.g. of less than 4° C. For instance, the beverage collecting surface is positioned adjacent: an upstream water flow part in the thermal conditioner; a downstream water flow part in the thermal conditioner; or therebetween.

The thermal conditioner may include a thermoblock having a massive metal block forming the body of the thermal conditioner. For instance, the massive metal block extends about a central axis of the beverage processing unit such as a centrifugation axis.

The thermal conditioner may have a duct in the body of the thermal conditioner. Such duct may be configured to guide and thermally condition the water to be delivered into the inlet. The duct may form one or more peripheral loops, e.g. extending helicoidally about a or the central axis of the beverage processing unit, such as a centrifugation axis. The duct may extend substantially in parallel and/or adjacent to the beverage collecting surface.

The thermal conditioner can include a thermal generator. For instance, the thermal generator is a heat remover (as a coldness generator), such as a thermocouple, and/or a heat generator, such as a resistive or inductive heater e.g. a discrete resistor and/or a thick film heater.

The thermal generator may form a peripheral loop extending about a or the above central axis of the beverage processing unit, such as a centrifugation axis. The thermal generator may form a structure extending substantially in parallel and/or adjacent to the beverage collecting surface.

The thermal generator can form an outside layer on the body of the thermal conditioner, such as an outside thick film resistor. The thermal generator may form an internal sunk component in the body of the thermal conditioner such as a discrete component, e.g. an electric resistor and/or induction heating path.

The machine may include a water source, such as a water tank, and an upstream water guide, e.g. a flexible guide, fluidically connected to the water source and to the thermal conditioner for guiding water from the source to the conditioner. For instance, the water guide is associated with a water driver, such as a pump, for driving water from the source to the conditioner via the guide. The guide may be made of one or more sections. The guide may also include or be associated with one or more functional parts, such as one or more of flowmeters, temperature sensors and pressure sensors.

The holder and the cover can be relatively movable, e.g. translationally and/or pivotally movable, between their open and closed positions along a guiding structure. The upstream water guide may pass at or by the guiding structure. For instance, the upstream water guide is secured by the guiding structure and a water guide support.

The invention also relates to a combination of a machine as described above and a capsule for preparing a beverage in such machine.

A further aspect of the invention relates to a method of preparing the beverage from the capsule in a machine as described above.

The method includes the steps of:
placing the capsule into the receiving space;
bringing the holder and cover into their closed position;
delivering the water conditioned by the thermal conditioner into the inlet of the cover, the thermal conditioner forming a conditioner cavity that delimits or contains the cover;
preparing the beverage by mixing the capsule's flavouring ingredient with the conditioned water; and
delivering the beverage via the outlet arrangement and collecting the delivered beverage on the thermally conditioned beverage collecting surface of the thermal conditioner.

Another aspect of the invention relates to a use of a capsule for: preparing the beverage in the above described machine; or implementing the above described combination; or preparing the beverage by the above described method.

BRIEF DESCRIPTION OF THE DRAWINGS

The invention will now be described with reference to the schematic drawings, wherein.

DETAILED DESCRIPTION

Figure 1:
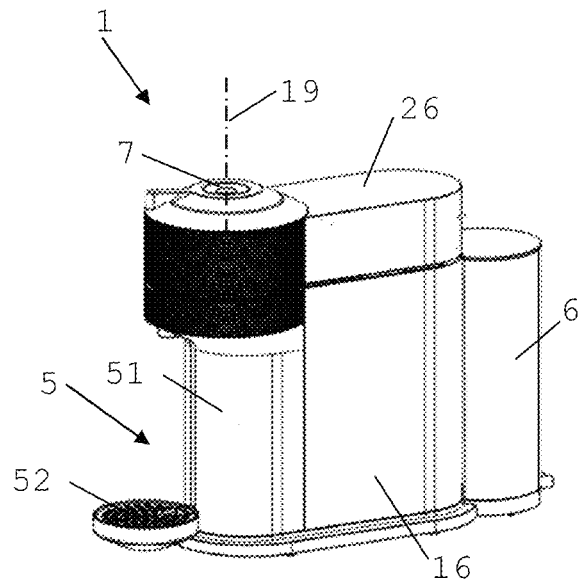
FIG. 1 is a perspective view of part of a machine according to the invention when its holder and cover are in the closed position.
Figure 1A:
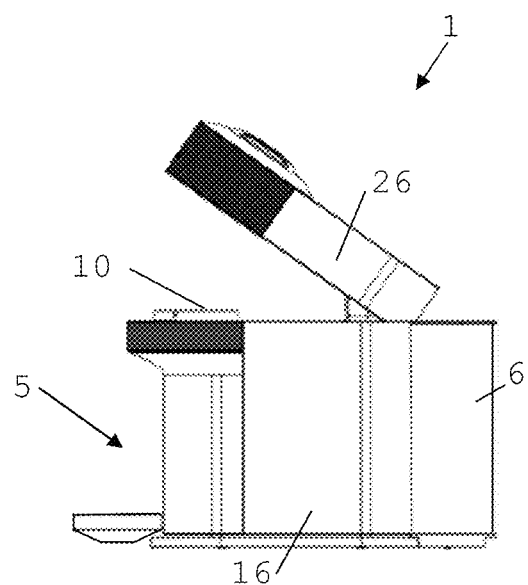
FIG. 1a is a side view of the machine shown in FIG. 1 when its holder and cover are in the open position.
Figure 2:
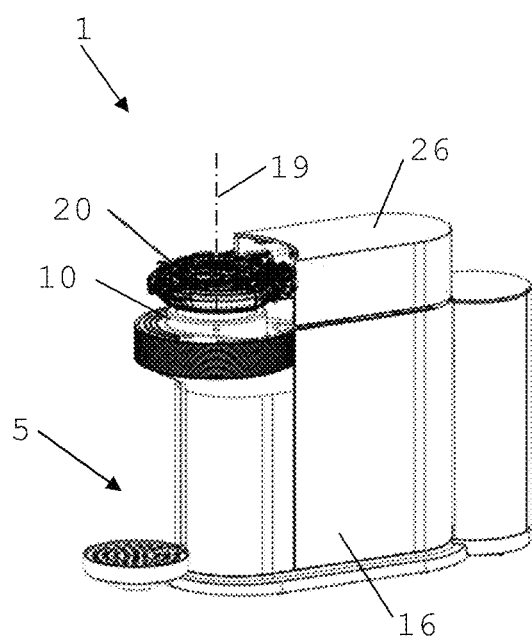
FIG. 2 is a perspective view of part of the machine shown in FIG. 1, showing the machine's thermal conditioner (after removal of part of the machine's upper housing), when its holder and cover are in the closed position.
Figure 2A:
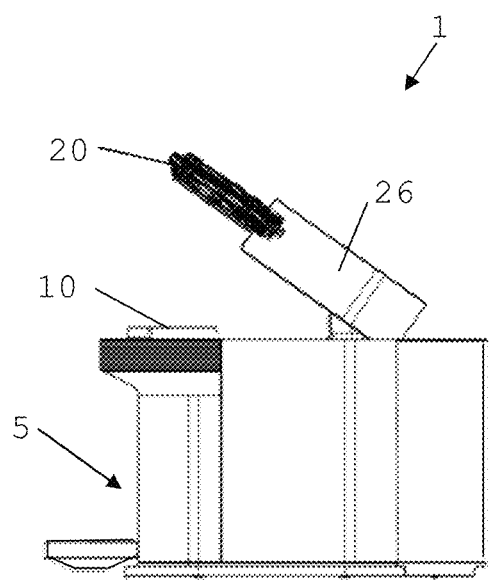
FIG. 2a is a perspective view of part of the machine shown in FIG. 1, showing the machine's thermal conditioner (after removal of part of the machine's upper housing), when its holder and cover are in the open position.
Figure 3:
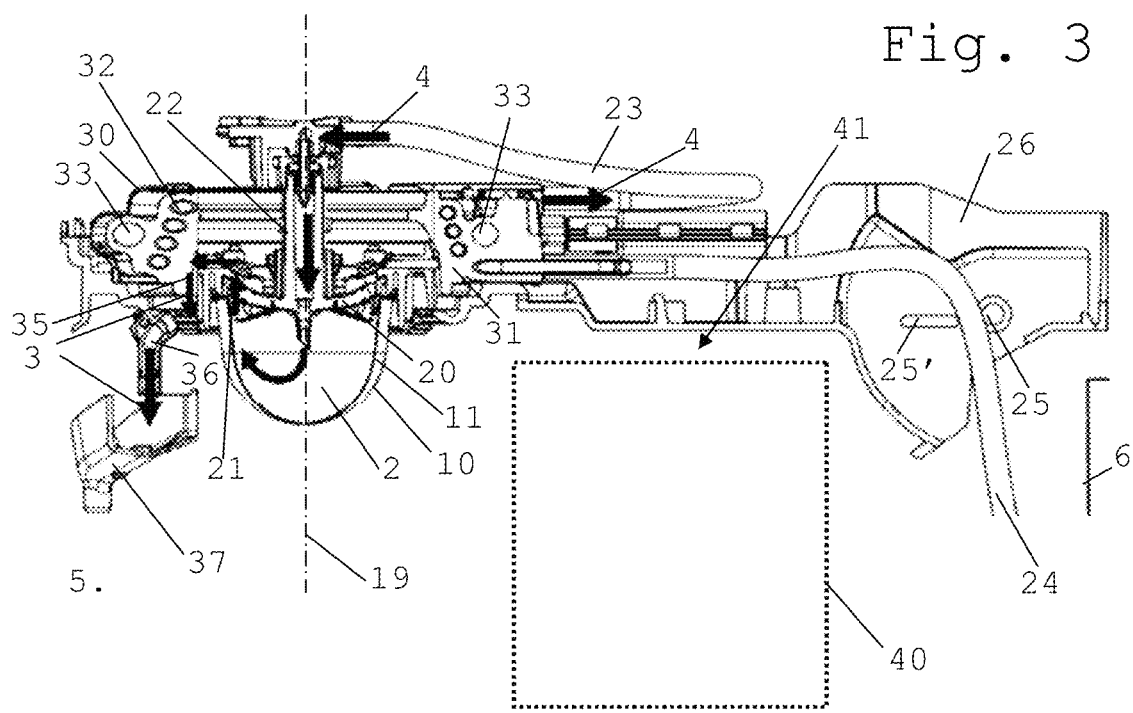
FIG. 3 is a partly schematic, cross-sectional view of part of the machine shown in FIG. 1.
Figures 4, 4A:
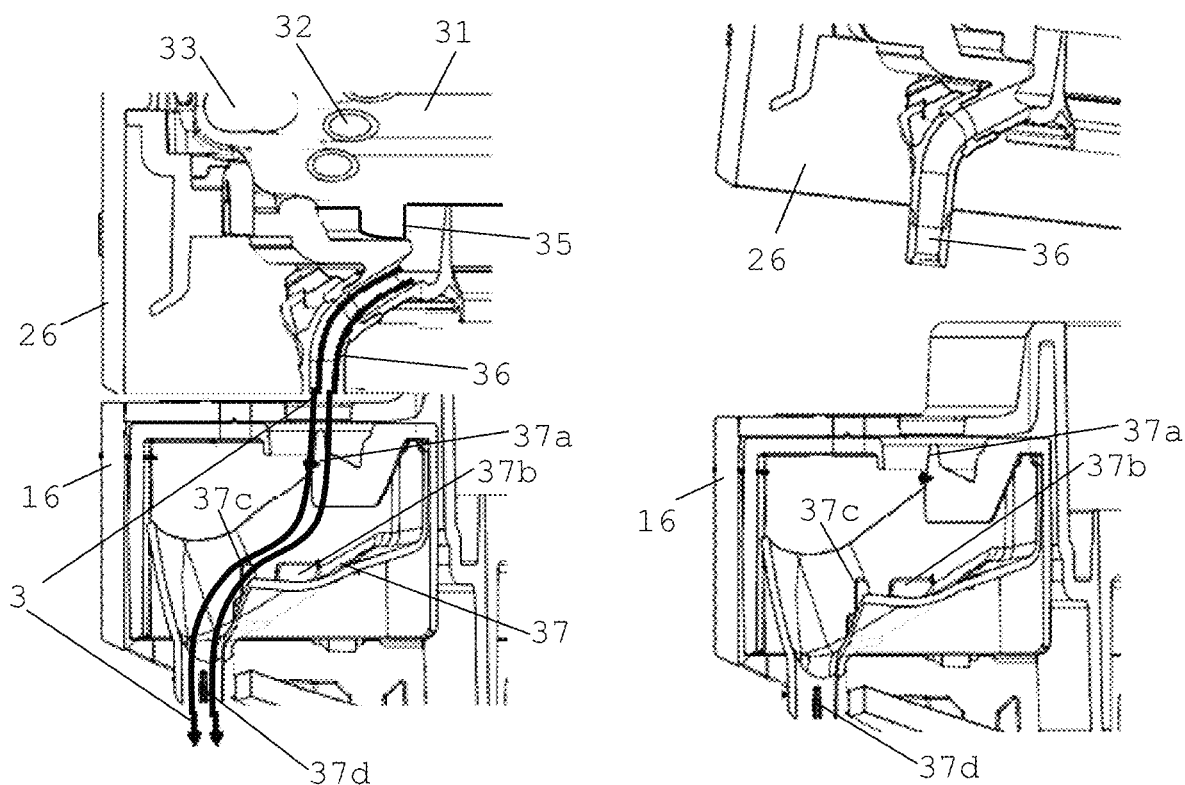
FIG. 4 is an enlarged view in cross-section of part of the thermal conditioner and discharge arrangement of the machine shown in FIG. 1, the holder and the cover being in their closed position.
FIG. 4a shows the parts illustrated in FIG. 4, when the holder and the cover are moved between their open and closed positions.

FIGS. 1 to 4a, in which the same numeric references generally designate the same parts, illustrate an exemplary embodiment of a capsule processing machine 1 and parts thereof in accordance with the invention.

Machine 1 is configured for preparing a beverage 3 from a capsule 2 having a body containing a flavouring ingredient, e.g. coffee or tea or cacao or milk, by passing water into such capsule so as to be mixed with the flavouring ingredient in the capsule, e.g. by centrifugally driving such capsule 2.

Machine 1 includes a beverage processing unit 10,20.

Unit 10,20 has a holder 10 delimiting a receiving space 11 for receiving capsule 2. For instance, receiving space 11 delimits a holder cavity 11 having an upwardly or sidewardly or slantingly oriented mouth via which capsule 2 is received in holder 10. For example, capsule 2 has a capsule flange that extends generally in parallel to the mouth.

Unit 10,20 includes a cover 20, such as a lid, for covering holder 10. Cover 20 and holder 10 are relatively movable: from an open position for placing capsule 2 into receiving space 11 and/or removing capsule 2 from receiving space 11; into a closed position for preparing beverage from capsule 2 in receiving space 11.

Unit 10,20 comprises a beverage outlet arrangement extending between holder 10 and cover 20 and/or through cover 20, configured to deliver beverage 3 from processing unit 10,20. For instance, outlet arrangement 21 is formed by a plurality of interstices between holder 10 and cover 20. The interstices can be delimited by a peripheral part of cover 20 and a facing interface face of capsule 2, e.g. a peripheral flange of capsule 2. For example, the outlet arrangement is in a generally horizontal and/or planar arrangement at a periphery of cover 20 facing holder 10 in the closed position of cover 20 and holder 10.

Unit 10,20 has a water inlet 22 extending through cover 20 configured to guide water 4 into receiving space 11 where it is mixed with the capsule's flavouring ingredient to form beverage 3.

Machine 1 includes a thermal conditioner 30, such as a heater and/or a cooler, that has a body 31 forming a thermally conditioned beverage collecting surface 35, such as a surface 35 delimiting at least part of an annular cavity facing e.g. surrounding the outlet arrangement 21.

For instance, the cavity is generally U-shaped in cross-section. The cavity may be annular and have an outer beverage impact wall and an inner beverage confinement wall and a lower bottom. For example, the impact wall and/or the confinement wall is/are formed by conditioner's body 31. The bottom may be formed by conditioner's body 31 or by a component that is thermally substantially distinct thereto and that is significantly less thermally conductive than conditioner's body 31.

Beverage collecting surface 35 is configured to collect and thermally condition beverage 3 delivered from outlet arrangement 21. Body 31 of thermal conditioner 30 is configured to thermally condition in body 31 water 4 for delivery into inlet 22, such as into inlet 22 via a water conduit 23 fluidically connecting conditioner 30 and inlet 22.

Machine 1 may include a selection arrangement 7, such as a control unit and connected thereto at least one of a user-interface 7 and a capsule recognition arrangement. Selection arrangement 7 may be configured to select a particular volume of water of a plurality of selectable available volumes to be supplied to water inlet 22 for preparing a correspondingly resulting desired volume of beverage 4.

Body 31 of thermal conditioner 30 may form a conditioner cavity 31 that delimits or contains at least partly cover 20.

Conditioner cavity 31 may delimit or contain cover 20 when holder 10 and cover 20 are in the closed position and when holder 10 and cover 20 are in the open position.

The conditioner's body 31 may surround entirely beverage processing unit 10,20 at a level of the unit's beverage outlet arrangement 21.

Machine 1 can have a frame or outside housing 16 that is stationary when beverage 3 is being prepared from capsule 2 in receiving space 11. Cover 20 may be movable relative to frame or housing 16 between the open and closed positions. Holder 10 may be stationary relative to frame or outside housing 16 when cover 20 and holder 10 are relatively moved between the open and closed positions.

Thermal conditioner 30 can be movable together with cover 20 relative to frame or outside housing 16.

Cover 20 may be pivotally and/or translationally movable relatively to frame or outside housing 16 along a guiding structure 25. Cover 20 may be pivotable relative to frame or outside housing 16 about a pivoting axis 25 that is remote from thermal conditioner 30. Pivoting axis 25 and thermal conditioner 30 can be spaced by a spacing distance that is greater than a greatest dimension of receiving space 11.

Machine 1 may include a functional block 40, such as a used capsule reservoir and/or a water reservoir. Cover can be pivotable relative to the frame or outside housing 16 about pivoting axis 25 that is remote from thermal conditioner 30. The functional block or an access to the functional block can be located in a space spacing the pivoting axis and the receiving space.

The cover 20 may be pivotable relative to the frame or outside housing 16 about a pivoting axis 25 that is remote from thermal conditioner 30. Cover 20 may be connected to pivoting axis 25 by a connection member 26. For instance, connection member 26 covers a or the above functional block 40 when cover 20 and holder 10 are in the closed position and uncovers functional block 40 when cover and holder 10 are in the open position. Connection member may form an upper housing part 26.

At least one of holder 10 and cover 20 may be connected to a driver that is arranged to drive holder 10 and cover 20 in rotation when the holder and the cover are in the closed position. For instance, the driver is configured to centrifuge receiving space 11 containing flavouring ingredient in capsule 2 and water 4 delivered by thermal conditioner 30 into receiving space 11 to: prepare beverage 3; and/or deliver beverage 3 via beverage outlet arrangement 21.

Machine 1 can have a discharge arrangement 36,37 configured to guide beverage 3 from beverage collecting surface 35 to a dispensing area 5 configured to receive a user-receptacle for collecting beverage 3 from machine 1. Dispensing area 5 may be delimited by an outside upright machine face 51 and/or a cup support 52.

Discharge arrangement 36,37 may have an upstream part 36 that is stationary relative to cover 20 when holder 10 and cover 20 are relatively moved between the open position and the closed position.

Discharge arrangement 36,37 can have a downstream part 37 that is stationary relative to holder 10 when the holder 10 and cover 20 are relatively moved between the open position and the closed position.

Discharge arrangement 36,37 may include a tubular part 36. For instance, tubular part 36 forms a or the above upstream part.

Discharge arrangement 36,37 can have a downstream member 37, such as a downstream chamber 37 for refining foam contained in said beverage 3. Downstream member 37 may include a refining arrangement, such as one or more bubble dividers 37a,37b,37c,37d. Downstream member 37 may comprise a liquid diverting member 37 that is configured to direct selectively beverage 3 to dispensing area 5 and waste liquid to a waste collector 40. Member 37 may form a or the above downstream part.

Discharge arrangement 36,37 may have at least one part, such as a or the above downstream part 37 that is removable by a user for cleaning and/or servicing.

Discharge arrangement 36,37 may have a first part, such as a or the above upstream part 36, and a second part, such as a or the above downstream part 37. The second part may be mounted in or to a or the above outside housing 16 that is stationary when beverage 3 is being prepared from capsule 2 in receiving space 11. The first part can be mounted in or to a connection member 26 connecting cover 20 to a guiding structure 25 configured for enabling holder 10 and cover 20 to relatively move, e.g. pivotally and/or translationally, between their open and closed positions along guiding structure 25, so that when holder 10 and cover 20 are in their closed position the first part projects into the outside housing and/or the second part projects into the connection member 26.

Machine 1 can be is configured such that beverage 3 when leaving beverage collecting surface 35 and water 4 when guided by water inlet 11 have a temperature difference of less than 10° C., such as a difference of less than 7° C., e.g. of less than 4° C. For instance, beverage collecting surface 35 is positioned adjacent: an upstream water flow part in thermal conditioner 30; a downstream water flow part in thermal conditioner 30; or therebetween.

Thermal conditioner 30 may include a thermoblock having a massive metal block 31 forming the body of the thermal conditioner. For instance, the massive metal block extends about a central axis 19 of beverage processing unit 10,20, such as a centrifugation axis 19.

Thermal conditioner 30 may have a duct 32 in body 31 of the thermal conditioner. Duct 32 can be configured to guide and thermally condition water 4 to be delivered into the inlet 22. For instance, duct 32 being configured to: form one or more peripheral loops, e.g. extending helicoidally about a or the above central axis 19 of beverage processing unit 10,20, such as a centrifugation axis 19; and/or extend substantially in parallel and/or adjacent to beverage collecting surface 35.

Thermal conditioner 30 may have a thermal generator 33. Such generator 33 may be a heat remover (coldness generator), such as a thermocouple, and/or a heat generator, such as a resistive and/or induction heater e.g. a discrete resistor and/or a thick film heater.

Thermal generator 33 may form a peripheral loop extending about a or the above central axis 19 of beverage processing unit 10,20, e.g. a centrifugation axis 19, and/or form a structure extending substantially in parallel and/or adjacent to beverage collecting surface 35.

Generator 33 may form an outside layer on body 31 of thermal conditioner 30, e.g. an outside thick film, and/or form an internal sunk component in body 31 of thermal conditioner 30, e.g. a discrete component, such as an electric resistor and/or induction heating path.

Machine 1 may have a water source 6, such as a water tank, and an upstream water guide 24, e.g. a flexible guide 24, fluidically connected to water source 6 and to thermal conditioner 30 for guiding water 4 from source 6 to conditioner 30. For instance, guide 24 is associated with a water driver, such as a pump, for driving water 4 from source 6 to conditioner 30 via guide 24.

Holder 10 and cover 20 may be relatively movable, e.g. translationally and/or pivotally movable, between their open and closed positions along a guiding structure 25. Upstream water guide 24 may pass at or by guiding structure 25. Upstream water guide 24 can be secured by guiding structure 25 and a water guide support 25'.

For preparing a beverage with the above machine and capsule, the following steps can be carried out:
- capsule 2 is placed into receiving space 11;
- holder 10 and cover 20 are brought into their closed position;
- water 4 conditioned by thermal conditioner 30 is delivered into inlet 22 of cover 20, thermal conditioner 30 forming a conditioner cavity 31 that delimits or contains cover 20;
- beverage 3 is prepared by mixing the capsule's flavouring ingredient with conditioned water 4; and
- beverage 3 is delivered via outlet arrangement 21 and delivered beverage 3 is collected on the thermally conditioned beverage collecting surface 35 of thermal conditioner 30.

From collecting surface 35, beverage 3 can be directly or indirectly delivered to a user-receptacle, such as a mug or a cup.

As mentioned above, capsule 2 may have a flange and a body that can be symmetric or asymmetric, conical or frusto-conical, pyramidal or frusto-pyramidal, cylindrical or prismatic, spherical or hemispherical or frusto-spherical, domical or frusto-domical, containing the ingredient, e.g. ground coffee, tea or cacao or another beverage ingredient.

The invention claimed is:

1. A capsule processing machine for preparing a beverage from a capsule having a body containing a flavouring ingredient, by passing water into the capsule to be mixed with the flavouring ingredient in the capsule, the capsule processing machine comprising:
   a beverage processing unit having:
      a holder delimiting a receiving space for receiving the capsule;
      a cover for covering the holder, the cover and the holder being relatively movable between:
         an open position for placing the capsule into the receiving space and/or removing the capsule from the receiving space; and
         a closed position for preparing the beverage from the capsule in the receiving space;
      a beverage outlet arrangement extending between the holder and the cover and/or through the cover, the beverage outlet arrangement configured to deliver the beverage from the processing unit; and
      a water inlet extending through the cover and configured to guide the water into the receiving space, wherein the water is mixed with the flavouring ingredient in the capsule to form the beverage in the receiving space; and
   a thermal conditioner, wherein a body of the thermal conditioner forms a conditioner cavity that defines or contains at least a part of the cover,
   wherein the body of the thermal conditioner forms a beverage collecting surface, and wherein the machine further comprises a discharge arrangement configured to guide the beverage from the beverage collecting surface to a dispensing area configured to receive a user-receptacle for collecting the beverage from the machine.

2. The capsule processing machine of claim 1, further comprising a frame or outside housing that is stationary when the beverage is being prepared from the capsule in the receiving space, and wherein the cover is movable relative to the frame or housing between the open position and the closed position.

3. The capsule processing machine of claim 2, wherein the thermal conditioner is movable together with the cover relative to the frame or outside housing.

4. The capsule processing machine of claim 2, wherein the cover is pivotally and/or translationally movable relatively to the frame or outside housing along a guiding structure.

5. The capsule processing machine of claim 4, further comprising a functional block, and wherein the cover is pivotable relative to the frame or outside housing about a pivoting axis that is remote from the thermal conditioner, the functional block, or an access to the functional block being located in a space spacing the pivoting axis and the receiving space.

6. The capsule processing machine of claim 4, wherein the cover is pivotable relative to the frame or outside housing about a pivoting axis that is remote from the thermal conditioner, the cover being connected to the pivoting axis by a connection member.

7. The capsule processing machine of claim 1, which comprises a water source.

8. The capsule processing machine of claim 1, wherein the outlet arrangement is formed by a plurality of interstices between the holder and the cover.

9. The capsule processing machine of claim 2, wherein the holder is stationary relative to the frame or outside housing when the cover and the holder are relatively moved between the open position and the closed position.

10. A capsule processing machine for preparing a beverage from a capsule having a body containing a flavouring ingredient, by passing water into the capsule to be mixed with the flavouring ingredient in the capsule, the capsule processing machine comprising:
    a beverage processing unit having:
       a holder delimiting a receiving space for receiving the capsule;
       a cover for covering the holder, the cover and the holder being relatively movable between:
          an open position for placing the capsule into the receiving space and/or removing the capsule from the receiving space; and a closed position for preparing the beverage from the capsule in the receiving space;

a beverage outlet arrangement extending between the holder and the cover and/or through the cover, the beverage outlet arrangement configured to deliver the beverage from the processing unit; and a water inlet extending through the cover and configured to guide the water into the receiving space, wherein the water is mixed with the flavouring ingredient in the capsule to form the beverage in the receiving space; and a thermal conditioner, wherein a body of the thermal conditioner forms a conditioner cavity that defines or contains at least a part of the cover wherein at least one of the holder and the cover is connected to a driver that is arranged to drive the at least one of the holder and the cover in rotation when the holder and the cover are in the closed position.

11. A capsule processing machine for preparing a beverage from a capsule having a body containing a flavouring ingredient, by passing water into the capsule to be mixed with the flavouring ingredient in the capsule, the capsule processing machine comprising:

a beverage processing unit having:

a holder delimiting a receiving space for receiving the capsule;

a cover for covering the holder, the cover and the holder being relatively movable between:

an open position for placing the capsule into the receiving space and/or removing the capsule from the receiving space; and a closed position for preparing the beverage from the capsule in the receiving space;

a beverage outlet arrangement extending between the holder and the cover and/or through the cover, the beverage outlet arrangement configured to deliver the beverage from the processing unit; and a water inlet extending through the cover and configured to guide the water into the receiving space, wherein the water is mixed with the flavouring ingredient in the capsule to form the beverage in the receiving space; and a thermal conditioner, wherein a body of the thermal conditioner forms a conditioner cavity that defines or contains at least a part of the cover, wherein the body of the thermal conditioner forms a beverage collecting surface, and wherein the machine is configured such that the beverage when leaving the beverage collecting surface and the water when guided by the water inlet have a temperature difference of less than 10° C.

12. A capsule processing machine for preparing a beverage from a capsule having a body containing a flavouring ingredient, by passing water into the capsule to be mixed with the flavouring ingredient in the capsule, the capsule processing machine comprising:

a beverage processing unit having:

a holder delimiting a receiving space for receiving the capsule;

a cover for covering the holder, the cover and the holder being relatively movable between:

an open position for placing the capsule into the receiving space and/or removing the capsule from the receiving space; and a closed position for preparing the beverage from the capsule in the receiving space;

a beverage outlet arrangement extending between the holder and the cover and/or through the cover, the beverage outlet arrangement configured to deliver the beverage from the processing unit; and a water inlet extending through the cover and configured to guide the water into the receiving space, wherein the water is mixed with the flavouring ingredient in the capsule to form the beverage in the receiving space; and a thermal conditioner, wherein a body of the thermal conditioner forms a conditioner cavity that defines or contains at least a part of the cover, wherein the thermal conditioner comprises at least one of:

a thermoblock having a metal block forming the body of the thermal conditioner;

a duct in the body of the thermal conditioner, the duct being configured to thermally condition the water into the water inlet; and a thermal generator.

13. The capsule processing machine of claim 12, wherein the metal block extends about a central axis of the beverage processing unit.

14. The capsule processing machine of claim 12, wherein the thermal generator comprises a heat remover and/or a heat generator.

15. The capsule processing machine of claim 14, wherein the thermal generator comprises one of a thermocouple, a resistive heater, and an inductive heater.

16. A combination of a machine for preparing a beverage from a capsule having a body containing a flavouring ingredient, by passing water into the capsule to be mixed with the flavouring ingredient in the capsule, the machine comprising:

a beverage processing unit having:

a holder delimiting a receiving space for receiving the capsule, a cover for covering the holder, the cover and the holder being relatively movable between:

an open position for placing the capsule into the receiving space and/or removing the capsule from the receiving space; and a closed position for preparing the beverage from the capsule in the receiving space, a beverage outlet arrangement extending between the holder and the cover and/or through the cover, the beverage outlet arrangement configured to deliver the beverage from the processing unit, and a water inlet extending through the cover and configured to guide the water into the receiving space, wherein the water is mixed with the flavouring ingredient in the capsule to form the beverage in the receiving space, and a thermal conditioner, wherein a body of the thermal conditioner forms a conditioner cavity that defines or contains at least a part of the cover, wherein the body of the thermal conditioner forms a beverage collecting surface, and wherein the machine further comprises a discharge arrangement configured to guide the beverage from the beverage collecting surface to a dispensing area configured to receive a user-receptacle for collecting the beverage from the machine; and the capsule for preparing the beverage in the machine.

17. A capsule processing machine for preparing a beverage from a capsule having a body containing a flavouring ingredient, by passing water into the capsule to be mixed with the flavouring ingredient in the capsule, the capsule processing machine comprising:
a beverage processing unit having:
a holder delimiting a receiving space for receiving the capsule;
a cover for covering the holder, the cover and the holder being relatively movable between:
an open position for placing the capsule into the receiving space and/or removing the capsule from the receiving space; and
a closed position for preparing the beverage from the capsule in the receiving space;
a beverage outlet arrangement extending between the holder and the cover and/or through the cover, the beverage outlet arrangement configured to deliver the beverage from the processing unit; and
a water inlet extending through the cover and configured to guide the water into the receiving space, wherein the water is mixed with the flavouring ingredient in the capsule to form the beverage in the receiving space;
a thermal conditioner, wherein a body of the thermal conditioner forms a conditioner cavity that defines or contains at least a part of the cover; and
a frame or outside housing that is stationary when the beverage is being prepared from the capsule in the receiving space, wherein the cover is movable relative to the frame or housing between the open position and the closed position, wherein the cover is pivotally and/or translationally movable relatively to the frame or outside housing along a guiding structure,
wherein the cover is pivotable relative to the frame or outside housing about a pivoting axis that is remote from the thermal conditioner, the cover being connected to the pivoting axis by a connection member,
wherein the connection member is configured to cover a functional block when the cover and the holder are in the closed position and to uncover the functional block when the cover and the holder are in the open position.

18. A combination of (i) a capsule having a body containing a flavouring ingredient and (ii) a machine for preparing a beverage from the capsule by passing water into the capsule to be mixed with the flavouring ingredient in the capsule, the machine comprising:
a beverage processing unit having:
a holder delimiting a receiving space for receiving the capsule,
a cover for covering the holder, the cover and the holder being relatively movable between:
an open position for placing the capsule into the receiving space and/or removing the capsule from the receiving space; and
a closed position for preparing the beverage from the capsule in the receiving space,
a beverage outlet arrangement extending between the holder and the cover and/or through the cover, the beverage outlet arrangement configured to deliver the beverage from the processing unit, and
a water inlet extending through the cover and configured to guide the water into the receiving space, wherein the water is mixed with the flavouring ingredient in the capsule to form the beverage in the receiving space, and
a thermal conditioner, wherein a body of the thermal conditioner forms a conditioner cavity that defines or contains at least a part of the cover, wherein the body of the thermal conditioner forms a beverage collecting surface, and
wherein the machine is configured such that the beverage when leaving the beverage collecting surface and the water when guided by the water inlet have a temperature difference of less than 10° C.

19. A combination of (i) a capsule having a body containing a flavouring ingredient and (ii) a machine for preparing a beverage from the capsule by passing water into the capsule to be mixed with the flavouring ingredient in the capsule, the machine comprising:
a beverage processing unit having:
a holder delimiting a receiving space for receiving the capsule,
a cover for covering the holder, the cover and the holder being relatively movable between:
an open position for placing the capsule into the receiving space and/or removing the capsule from the receiving space; and
a closed position for preparing the beverage from the capsule in the receiving space,
a beverage outlet arrangement extending between the holder and the cover and/or through the cover, the beverage outlet arrangement configured to deliver the beverage from the processing unit, and
a water inlet extending through the cover and configured to guide the water into the receiving space, wherein the water is mixed with the flavouring ingredient in the capsule to form the beverage in the receiving space, and
a thermal conditioner, wherein a body of the thermal conditioner forms a conditioner cavity that defines or contains at least a part of the cover,
wherein the thermal conditioner comprises at least one of:
a thermoblock having a metal block forming the body of the thermal conditioner;
a duct in the body of the thermal conditioner, the duct being configured to thermally condition the water into the water inlet; and
a thermal generator.

20. A combination of (i) a capsule having a body containing a flavouring ingredient and (ii) a machine for preparing a beverage from the capsule by passing water into the capsule to be mixed with the flavouring ingredient in the capsule, the machine comprising:
a beverage processing unit having:
a holder delimiting a receiving space for receiving the capsule,
a cover for covering the holder, the cover and the holder being relatively movable between:
an open position for placing the capsule into the receiving space and/or removing the capsule from the receiving space; and
a closed position for preparing the beverage from the capsule in the receiving space,
a beverage outlet arrangement extending between the holder and the cover and/or through the cover, the beverage outlet arrangement configured to deliver the beverage from the processing unit, and
a water inlet extending through the cover and configured to guide the water into the receiving space, wherein the water is mixed with the flavouring ingredient in the capsule to form the beverage in the receiving space, and a thermal conditioner, wherein a body of the thermal conditioner forms a conditioner cavity that defines or contains at least a part of the cover; and a frame or outside housing that is stationary when the beverage is being prepared from the capsule in the receiving space, wherein the cover is movable relative to the frame or housing between the open position and the closed position, wherein the cover is pivotally and/or translationally movable relatively to the frame or outside housing along a guiding structure, wherein the cover is pivotable relative to the frame or outside housing about a pivoting axis that is remote from the thermal conditioner, the cover being connected to the pivoting axis by a connection member, wherein the connection member is configured to cover a functional block when the cover and the holder are in the closed position and to uncover the functional block when the cover and the holder are in the open position.

* * * * *